United States Patent
Nilsson

(10) Patent No.: US 9,935,723 B2
(45) Date of Patent: Apr. 3, 2018

(54) USER TERMINAL DEVICE FOR INTERFERENCE LIMITED SCENARIOS

(71) Applicant: TELEFONAKTIEBOLAGET LM ERICSSON (PUBL), Stockholm (SE)

(72) Inventor: Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/118,056

(22) PCT Filed: Feb. 11, 2014

(86) PCT No.: PCT/EP2014/052606
§ 371 (c)(1),
(2) Date: Aug. 10, 2016

(87) PCT Pub. No.: WO2015/120877
PCT Pub. Date: Aug. 20, 2015

(65) Prior Publication Data
US 2017/0012722 A1 Jan. 12, 2017

(51) Int. Cl.
*H01Q 1/24* (2006.01)
*H04B 17/336* (2015.01)
(Continued)

(52) U.S. Cl.
CPC ........... *H04B 17/336* (2015.01); *H01Q 1/243* (2013.01); *H01Q 3/24* (2013.01); *H01Q 21/062* (2013.01);
(Continued)

(58) Field of Classification Search
CPC ............. H01Q 1/24; H01Q 3/24; H01Q 21/24
(Continued)

(56) References Cited

U.S. PATENT DOCUMENTS 8,164,525 B2 * 4/2012 Park .................... H01Q 1/2266
343/700 MS
8,654,032 B2 * 2/2014 Yoon .................... H01Q 1/521
343/702
(Continued)

FOREIGN PATENT DOCUMENTS

EP 1148584 A2 10/2001
EP 1830485 A1 9/2007
(Continued)

OTHER PUBLICATIONS

International Search Report and Written Opinion dated Oct. 20, 2014, in International Application No. PCT/EP2014/052606, 11 pages.

*Primary Examiner* — Huedung Mancuso
(74) *Attorney, Agent, or Firm* — Rothwell, Figg, Ernst & Manbeck, P.C.

(57) ABSTRACT

The present invention relates to a user terminal device comprising a first and second antenna arrangement and a first and second radio chain arrangement. The first antenna arrangement comprises at least a first antenna element and a first and second antenna port. The second antenna arrangement comprises a third and fourth antenna port, a first polarized antenna element arranged for transmitting and/or receiving signals at a first polarization via the third antenna port and a second polarized antenna element arranged for transmitting and/or receiving signals at a second polarization via the fourth antenna port. The polarizations are mutually orthogonal in at least one direction. A first switching device is arranged to connect the first radio chain arrangement with either the first or third antenna port, and a second switching device is arranged to connect the second radio chain arrangement with either the second or fourth antenna port.

12 Claims, 2 Drawing Sheets

(51) Int. Cl.
  *H01Q 3/24* (2006.01)
  *H01Q 21/24* (2006.01)
  *H01Q 25/00* (2006.01)
  *H04B 7/06* (2006.01)
  *H04B 7/08* (2006.01)
  *H04B 7/10* (2017.01)
  *H01Q 21/06* (2006.01)
  *H04L 12/26* (2006.01)
  *H04W 72/04* (2009.01)

(52) U.S. Cl.
  CPC ............ *H01Q 21/24* (2013.01); *H01Q 25/00* (2013.01); *H04B 7/0602* (2013.01); *H04B 7/0805* (2013.01); *H04B 7/10* (2013.01); *H04L 43/16* (2013.01); *H04W 72/0453* (2013.01)

(58) Field of Classification Search
  USPC ........................................................ 343/703
  See application file for complete search history.

(56) References Cited

U.S. PATENT DOCUMENTS

| | | | |
|---|---|---|---|
| 2002/0140612 A1* | 10/2002 | Kadambi | H01Q 9/0421 343/702 |
| 2004/0233111 A1* | 11/2004 | Desclos | H01Q 1/38 343/700 MS |
| 2006/0109191 A1 | 5/2006 | Shtrom et al. | |
| 2007/0194929 A1 | 8/2007 | Wagner et al. | |
| 2008/0174508 A1* | 7/2008 | Iwai | H01Q 9/30 343/850 |
| 2010/0277395 A1 | 11/2010 | Satoh et al. | |

FOREIGN PATENT DOCUMENTS

| | | |
|---|---|---|
| EP | 2053692 A2 | 4/2009 |
| EP | 2157660 A1 | 2/2010 |
| EP | 2360780 A2 | 1/2012 |
| EP | 2360780 A3 | 1/2012 |

* cited by examiner

USER TERMINAL DEVICE FOR INTERFERENCE LIMITED SCENARIOS

CROSS REFERENCE TO RELATED APPLICATION(S)

This application is a 35 U.S.C. § 371 National Phase Entry Application from PCT/EP2014/052606, filed Feb. 11, 2014, designating the United States, the disclosure of which is incorporated herein in its entirety by reference.

TECHNICAL FIELD

The present invention relates to a user terminal device comprising a first antenna arrangement, a second antenna arrangement, a first radio chain arrangement and a second radio chain arrangement. The first antenna arrangement comprises at least a first antenna element, a first antenna port and a second antenna port.

The present invention also relates to a method for adapting a user terminal device to detected communication properties.

BACKGROUND

In the future, wireless communication systems may use smaller cells and denser deployments. This will lead to an increased probability of Line-of-sight (LOS) communication between base stations and user terminals as well as increased interference level. The wireless communication systems today are usually interference limited, and in the future the interference over noise level will probably be even higher.

The antennas that are used in user terminals are typically designed to have high efficiency for a large number of frequency bands, so-called multi-band antennas. When designing multi-band antennas for user terminals, it is difficult to achieve a desired polarization for the antenna pattern while at the same time keeping the efficiency high. This means that if there are two multi-band antennas in a user terminal, the polarization orthogonality between the antennas is typically not good. When user terminals are in LOS to a base station, it is difficult to achieve more than one stream per polarization due to low scattering. In such situations, it is desirable to have user terminal antennas with mutually orthogonal polarization.

In this context, the term efficiency at an antenna port of an antenna is defined as $1-(S_{11})^2$, where $S_{11}$ is the return loss at the antenna port in question.

It is therefore a desire to provide a user terminal device for use in a wireless communication system, where the user terminal device is arranged to provide a desired functionality for different scenarios such as LOS and non-LOS scenarios where the scattering may be low or high.

SUMMARY

It is an object of the present invention to provide a user terminal device that is arranged to provide a desired functionality for different scenarios such as LOS and non-LOS scenarios where the scattering may be low or high.

Said object is obtained by means of a user terminal device comprising a first antenna arrangement, a second antenna arrangement, a first radio chain arrangement and a second radio chain arrangement. The first antenna arrangement comprises at least a first antenna element, a first antenna port and a second antenna port. The second antenna arrangement comprises a third antenna port, a fourth antenna port, a first polarized antenna element arranged for transmitting and/or receiving signals at a first polarization via the third antenna port and a second polarized antenna element arranged for transmitting and/or receiving signals at a second polarization via the fourth antenna port. The polarizations are mutually orthogonal in at least one direction. The user terminal device further comprises a first switching device and a second switching device. The first switching device is arranged to connect the first radio chain arrangement with either the first antenna port or the third antenna port, and where the second switching device is arranged to connect the second radio chain arrangement with either the second antenna port or the fourth antenna port.

Said object is also obtained by means of a method for adapting a user terminal device to detected communication properties. The method comprises the steps of: connecting a first radio chain arrangement with either a first antenna port or a third antenna port; and connecting a second radio chain arrangement with either a second antenna port or a fourth antenna port.

The first antenna port and the second antenna port are used at a first antenna arrangement at the user terminal device, and the third antenna port and the fourth antenna port are used at a second antenna arrangement at the user terminal device. The second antenna arrangement has a first polarized antenna element, used for transmitting and/or receiving signals at a first polarization via the third antenna port, and a second polarized antenna element, used for transmitting and/or receiving signals at a second polarization via the fourth antenna port. The polarizations are mutually orthogonal in at least one direction.

According to an example, the first polarized antenna element and the second polarized antenna element are in the form of dipole antennas.

According to another example, the first polarized antenna element and the second polarized antenna element lie in a common plane, and perpendicular to this common plane, the polarizations are mutually orthogonal.

According to another example, the polarizations at which signals are transmitted and/or received via third antenna port and the fourth antenna port have a higher average degree of orthogonality for all propagation angles than those polarizations at which signals are transmitted and/or received via the first antenna port and the second antenna port in that frequency band, or those frequency bands, at which the user terminal device is arranged to operate.

According to another example, the first switching device and the second switching device are arranged to connect a respective radio chain arrangement to a corresponding antenna port in dependence of the relations between a measured signal level, a measured noise level, a measured interference level, and a previously known degree of efficiency at those antenna ports that are connected to a respective radio chain arrangement.

According to another example, the first switching device is arranged to switch from connecting the first radio chain arrangement with the first antenna port to connecting the first radio chain arrangement with the third antenna port when a relation between the measured interference level and noise level at the first antenna port exceeds a first threshold value. Correspondingly, the second switching device is arranged to switch from connecting the second radio chain arrangement with the second antenna port to connecting the second radio chain arrangement with the fourth antenna port when a relation between the measured interference level and noise level at the second antenna port exceeds a second threshold value.

According to another example, the first switching device is arranged to switch from connecting the first radio chain arrangement with the third antenna port to connecting the first radio chain arrangement with the first antenna port when a relation between the measured interference level and noise level at the third antenna port falls below a third threshold value. Correspondingly, the second switching device is arranged to switch from connecting the second radio chain arrangement with the fourth antenna port to connecting the second radio chain arrangement with the second antenna port when a relation between the measured interference level and noise level at the fourth antenna port falls below a fourth threshold value.

More examples are disclosed in the dependent claims.

A number of advantages are obtained by means of the present invention. Mainly, the capacity for user terminals experiencing interference limited conditions is increased.

BRIEF DESCRIPTION OF THE DRAWINGS

The present invention will now be described more in detail with reference to the appended drawings, where.

DETAILED DESCRIPTION

Figure 1:
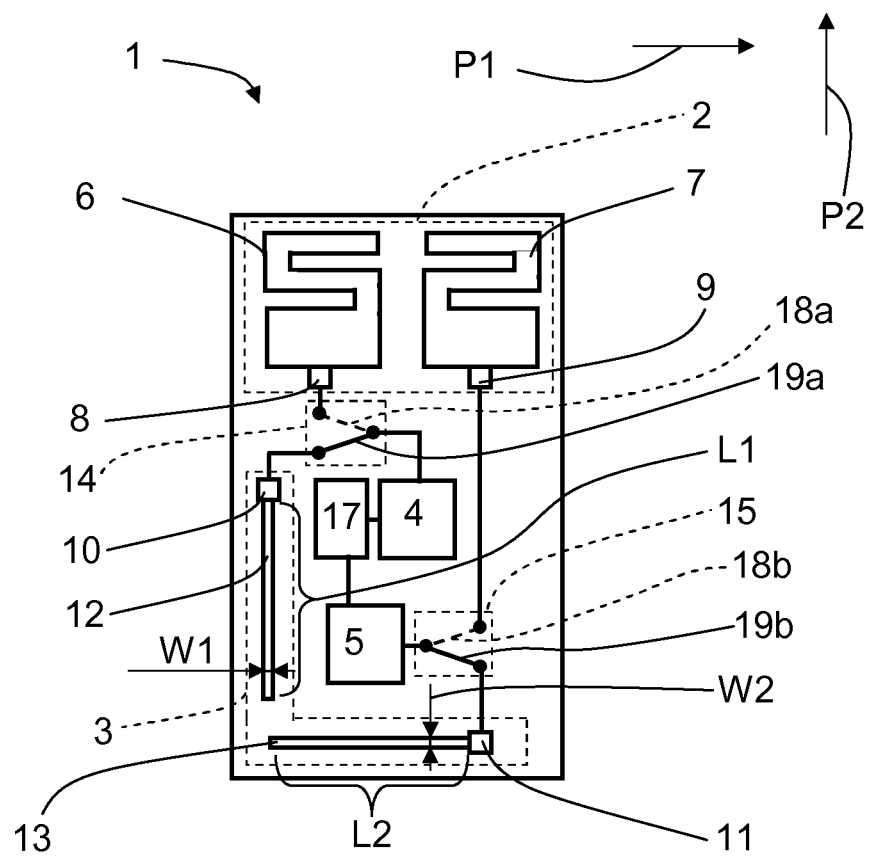
FIG. 1 shows a schematical view of a first example of a user terminal device according to the present invention.

With reference to FIG. 1, there is a user terminal device 1 comprising a first antenna arrangement 2, a first radio chain arrangement 4 and a second radio chain arrangement 5. The first antenna arrangement 2 comprises a first antenna element 6, and a second antenna element 7, where these antenna elements are designed to function as multi-band antennas, and for example are in the form of so-called PIFA:s (Planar Inverted F-Antennas). The first antenna element is connected to a first antenna port 8 and the second antenna element 7 is connected to second antenna port 9.

The first antenna port 8 is switchably connectable to the first radio chain arrangement 4 by means of a first switching device 14, and the second antenna port 9 is switchably connectable to the second radio chain arrangement 5 by means of a second switching device 15.

According to the present invention, the user terminal device 1 comprises a second antenna arrangement 3 which in turn comprises a third antenna port 10, a fourth antenna port 11, a first polarized antenna element 12 arranged for transmitting and/or receiving signals at a first polarization P1 via the third antenna port 10, and a second polarized antenna element 13 arranged for transmitting and/or receiving signals at a second polarization P2 via the fourth antenna port 11.

The polarizations P1, P2 are mutually orthogonal in at least one direction, in this example the first polarized antenna element 12 and the second polarized antenna element 13 are in the form of dipole antennas that lie in a common plane. The polarizations are mutually orthogonal perpendicular to said common plane. The polarizations P1, P2 at which signals are transmitted and/or received via the third antenna port 10 and the fourth antenna port 11 have a higher average degree of orthogonality for all propagation angles than those polarizations at which signals are transmitted and/or received via the first antenna port 8 and the second antenna port 9 in that frequency band, or those frequency bands, at which the user terminal device 1 is arranged to operate. The average degree of orthogonality is defined as a calculated average of the orthogonality between the antenna diagrams of the different polarizations P1, P2 for all angels.

The first dipole antenna has a first length L1 and a first width W1 that is orthogonal to the first length L1, and the second dipole antenna 13 has a second length L2 and a second width W2 that is orthogonal to the second length L2.

The third antenna port 10 is switchably connectable to the first radio chain arrangement 4 by means of the first switching device 14, and the fourth antenna port 11 is switchably connectable to the second radio chain arrangement 5 by means of the second switching device 15.

This means that the first switching device 14 is arranged to connect the first radio chain arrangement 4 with either the first antenna port 8, as indicated with a first dashed line 18a, or the third antenna port 10, as indicated with a first solid line 19a. Furthermore, the second switching device 15 is arranged to connect the second radio chain arrangement 5 with either the second antenna port 9, as indicated with a second dashed line 18b, or the fourth antenna port 11, as indicated with a second solid line 19b.

In this example, either the first antenna port 8 and the second antenna port 9, or the third antenna port 10 and the fourth antenna port 11, are connected to the respective radio chain arrangement 4, 5, i.e. either the switching devices 14, 15 are connecting via the dashed lines 18a, 18b or via the solid lines 19a, 19b. In a first mode of operation, the first antenna port 8 and the second antenna port 9 are connected to the respective radio chain arrangement 4, 5, and in a second mode of operation, the third antenna port 10 and the fourth antenna port 11 are connected to the respective radio chain arrangement 4, 5.

The first mode of operation is used for scenarios where there is a high scattering environment, where the interference level is below the noise level and/or if the correlation between the two antennas is relatively low.

The second mode of operation is used for scenarios where there is a low scattering environment, possibly LOS between the user terminal and a base station, where the interference level exceeds the noise level to a certain extent, interference limited scenarios, and where the correlation between the first antenna port and the second antenna port is relatively high.

More in detail, in interference limited scenarios, the efficiency of the antennas used in the user terminal device does not affect the performance, as long as the efficiency of the antennas does not fall below the difference between the interference level and the noise level. For example, if there is a noise level of −90 dBm, an interference level of −60 dBm and if the efficiency of the antenna is −20 dB, the interference over noise level would still be 10 dB, which means that the efficiency of the antenna does not affect the performance.

In this context, the term efficiency at an antenna port of an antenna is defined as $1-(S_{11})^2$, where $S_{11}$ is the return loss at the antenna port in question.

The two polarized antenna elements 12, 13 may have limited efficiency compared to the first antenna 6 and second antenna 7 of the first antenna arrangement 2. This means that any one of the first antenna port 8 and second antenna port 9 presents a higher degree of efficiency than any one of the third antenna port 10 and the fourth antenna port 11 in that frequency band, or those frequency bands, at which the user terminal device is arranged to operate.

Then it is important to only use the two polarized antenna elements 12, 13 in scenarios where the interference is much larger than the noise; otherwise the performance could be negatively affected when switching to these antennas. Therefore, the first switching device 14 and the second switching device 15 are arranged to connect a respective radio chain arrangement 4, 5 to a corresponding antenna port 8, 10; 9, 11 in dependence of the relations between a measured signal level, a measured noise level, a measured interference level, and a previously known degree of efficiency at those antenna ports 8, 10; 9, 11 that are connected to a respective radio chain arrangement 4, 5.

For this purpose, an algorithm that calculates and compares the noise and the interference is needed at the user terminal device 1, suitable implemented by means of one or more control units 17. A user terminal device 1 may be arranged to estimate both noise and interference by using measurements on reference signals. Switching to the polarized antenna elements 12, 13 is preferred mainly when the correlation between the first antenna 6 and second antenna 7 of the first antenna arrangement 2 are high, typically in low scattering environments as for example in LOS conditions. This could be realized for example by investigating the rank of the channel matrix.

As an example of such a procedure, suitable implemented by means of said control unit 17, first it is checked if the received signals are interference limited or noise limited. This should preferably be done over some period of time to increase the reliability of the measurements. If the user terminal device 1 is determined to be interference limited, the signal correlation between the antennas is tested. This should preferably be done over some period of time in order to gather statistical results which would increase the reliability. If the signal correlation is relatively low between the first antenna 6 and the second antenna 7 of the first antenna arrangement 2, and falls below a certain threshold, the user terminal device 1 is arranged to switch to the two polarized antenna elements 12, 13, i.e. from the first mode of operation to the second mode of operation.

After the switch to the second mode of operation, the user terminal device 1 is arranged to keep track of the interference and noise level as well as the signal correlation. If the interference level is below the noise level, or if the correlation between the two antennas falls below a certain threshold, the user terminal device 1 is arranged switch back to the first mode of operation.

Generally, the first switching device 14 is arranged to switch from connecting the first radio chain arrangement 4 with the first antenna port 8 to connecting the first radio chain arrangement 4 with the third antenna port 10 when a relation between the measured interference level and noise level at the first antenna port 8 exceeds a first threshold value. In the same way, the second switching device 15 is arranged to switch from connecting the second radio chain arrangement 5 with the second antenna port 9 to connecting the second radio chain arrangement 5 with the fourth antenna port 11 when a relation between the measured interference level and noise level at the second antenna port 9 exceeds a second threshold value.

Correspondingly, the first switching device 14 is arranged to switch from connecting the first radio chain arrangement 4 with the third antenna port 10 to connecting the first radio chain arrangement 4 with the first antenna port 8 when a relation between the measured interference level and noise level at the third antenna port 10 falls below a third threshold value. In the same way, the second switching device 15 is arranged to switch from connecting the second radio chain arrangement 5 with the fourth antenna port 11 to connecting the second radio chain arrangement 5 with the second antenna port 9 when a relation between the measured interference level and noise level at the fourth antenna port 11 falls below a fourth threshold value.

As an alternative, if the correlation between the third antenna port 10 and the fourth antenna port 10 falls below a certain threshold value, different combinations of all the antenna ports 8, 9; 10, 11 are conceivable in order to maintain an optimal functionality for the present scenario.

The efficiency of the two polarized antenna elements 12, 13 varies with frequency. Therefore, the interference over noise ratio needed for using the polarized antenna elements 12, 13 differs for different frequencies. To solve this, the user terminal device 1 can have prior knowledge of the efficiency as a function of the frequency for the two polarized antenna elements 12, 13. Alternatively, the user terminal device 1 is arranged to log the results when switching to the polarized antenna elements 12, 13 in the second mode of operation, and use these statistical results to get an understanding of how the efficiency of the two polarized antenna elements 12, 13 depends on the frequency.

Figure 2:
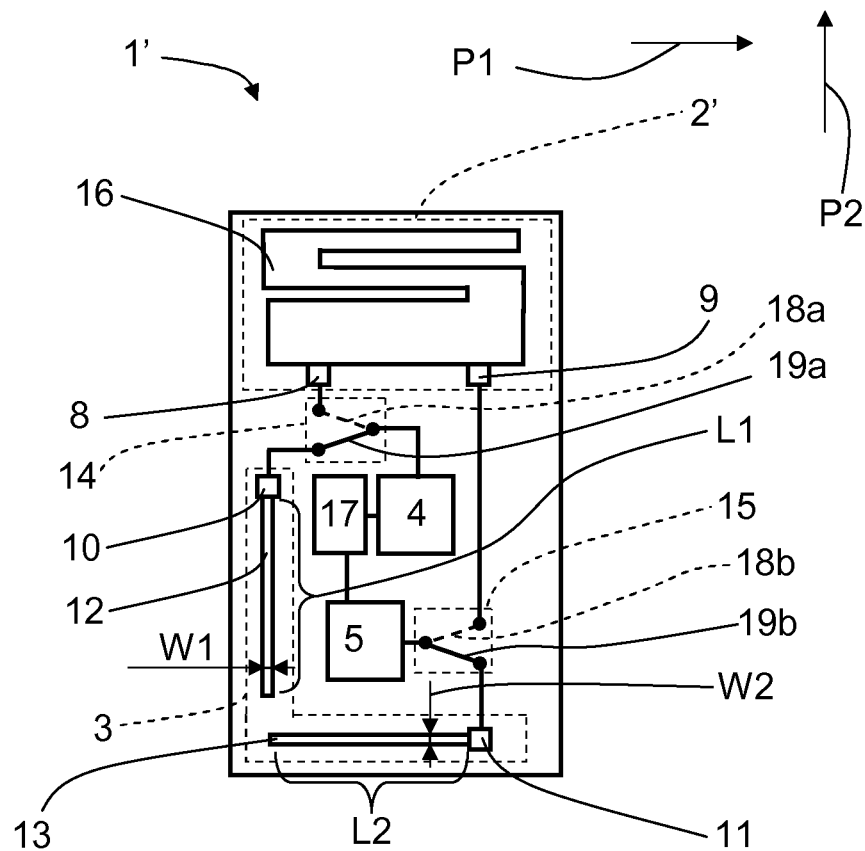
FIG. 2 shows a schematical view of a second example of a user terminal device according to the present invention.

FIG. 2 shows an example of another type of first antenna arrangement 2' of a user terminal device 1'. Here, the first antenna arrangement 2' still comprises a first antenna port 8 and a second antenna port 9, but these antenna ports 8, 9 are connected at different positions of one and a same coherent antenna element 16. By connecting two antenna ports to one coherent antenna element, the available area may be more efficiently used.

Mainly, the present invention relates to a user terminal device 1, 1' comprising a first antenna arrangement 2, 2', a second antenna arrangement 3, a first radio chain arrangement 4 and a second radio chain arrangement 5. The first antenna arrangement 2 comprises one or two multi-band antennas with two multi-band antenna ports, and the second antenna arrangement 3 comprises polarized antenna elements 12, 13 with two antenna ports having as orthogonal polarizations as possible. The polarized antenna elements do not need to have high efficiency; instead the design focus will be to maximize the polarization orthogonality. When the user terminal device 1, 1' has good signal strength but is interference limited and the rank is low due to high correlation between the multi-band antenna ports, the user terminal device 1, 1' is arranged to switch from these antenna ports to the two antenna ports with orthogonal polarizations.

The present invention is not limited to the examples above, but may vary freely within the scope of the appended claims. For example, the user terminal device 1 may be constituted by any type of mobile phone, tablet, laptop or similar.

The polarized antenna elements do need to be dipole antennas, but should have desired proportions that enable the polarizations P1, P2 to be mutually orthogonal in at least one direction. As an example of desired proportions of the polarized antenna elements 12, 13, each length L1, L2 exceeds the corresponding width W1, W2 by at least five times.

The antenna 16 or antennas 6, 7 of the first antenna arrangement 2, 2' may be any suitable type of multi-band antenna.

All antennas may be etched on a circuit board, or may be in the form of separate components.

The switching devices may be of any suitable sort, for example they may comprise PIN-diodes. The radio chain arrangements are of any suitable design for use in a user terminal device. Measurements, switching devices 4, 5 and other functions may be controlled by one or several of said control unit 17.

Only those parts of a user terminal 1, 1' that are considered relevant for explaining the present invention have been described, all other parts are considered as obvious for the skilled person.

Terms such as for example orthogonal do in this context not mean to interpreted as mathematically exact, but within what is practically obtainable in this field of technology.

The invention claimed is:

1. A user terminal device comprising:
   a first radio chain arrangement and a second radio chain arrangement;
   a first antenna arrangement comprising at least: (i) a first antenna element, (ii) a first antenna port and (iii) a second antenna port;
   a second antenna arrangement comprising at least: (i) a third antenna port, (ii) a fourth antenna port, (iii) a first polarized antenna element arranged for at least one of transmitting and receiving signals at a first polarization via the third antenna port, and (iv) a second polarized antenna element arranged for at least one of transmitting and receiving signals at a second polarization via the fourth antenna port,
   wherein the polarizations are mutually orthogonal in at least one direction;
   a first switching device configured to connect the first radio chain arrangement with at least one of: (i) the first antenna arrangement via the first antenna port and (ii) the first polarized antenna element via the third antenna port; and
   a second switching device configured to connect the second radio chain arrangement with at least one of: (i) the first antenna arrangement via the second antenna port and (ii) the second polarized antenna element via the fourth antenna port,
   wherein the first switching device and the second switching device are configured to connect a respective radio chain arrangement to a corresponding antenna port in dependence of the relations between a measured signal level, a measured noise level, a measured interference level, and a previously known degree of efficiency at those antenna ports that are connected to a respective radio chain arrangement.

2. The user terminal device according to claim 1, where the first polarized antenna element has a first length and a first width that is orthogonal to the first length, and the second polarized antenna element has a second length and a second width that is orthogonal to the second length, where the first length is orthogonal to the second length, and where each length exceeds the corresponding width by at least five times.

3. The user terminal device according to claim 1, where the first polarized antenna element and the second polarized antenna element are in the form of dipole antennas.

4. The user terminal device according to claim 1, where the first polarized antenna element and the second polarized antenna element lie in a common plane, and where the polarizations are mutually orthogonal perpendicular to said common plane.

5. The user terminal device according to claim 1, where the polarizations at which signals are transmitted and/or received via third antenna port and the fourth antenna port have a higher average degree of orthogonality for all propagation angles than those polarizations at which signals are transmitted and/or received via the first antenna port and the second antenna port in that frequency band, or those frequency bands, at which the user terminal device is arranged to operate.

6. The user terminal device according to claim 1, where any one of the first antenna port and second antenna port presents a higher degree of efficiency than any one of the third antenna port and the fourth antenna port in that frequency band, or those frequency bands, at which the user terminal device is arranged to operate.

7. The user terminal device according to claim 5, where the first switching device is arranged to switch from connecting the first radio chain arrangement with the first antenna port to connecting the first radio chain arrangement with the third antenna port when a relation between the measured interference level and noise level at the first antenna port exceeds a first threshold value, and in that the second switching device is arranged to switch from connecting the second radio chain arrangement with the second antenna port to connecting the second radio chain arrangement with the fourth antenna port when a relation between the measured interference level and noise level at the second antenna port exceeds a second threshold value.

8. The user terminal device according to claim 5, where the first switching device is arranged to switch from connecting the first radio chain arrangement with the third antenna port to connecting the first radio chain arrangement with the first antenna port when a relation between the measured interference level and noise level at the third antenna port falls below a third threshold value, and where the second switching device is arranged to switch from connecting the second radio chain arrangement with the fourth antenna port to connecting the second radio chain arrangement with the second antenna port when a relation between the measured interference level and noise level at the fourth antenna port falls below a fourth threshold value.

9. A method for adapting a user terminal device to detected communication properties, comprising the steps of:
   connecting a first radio chain arrangement with at least one of a first antenna port and a third antenna port;
   connecting a second radio chain arrangement with at least one of a second antenna port and a fourth antenna port; and
   connecting a respective radio chain arrangement to a corresponding antenna port in dependence of relations between a measured signal level, a measured noise level, a measured interference level, and a previously known degree of efficiency at those antenna ports that are connected to a respective radio chain arrangement,
   wherein a first antenna arrangement comprises at least: (i) a first antenna element, (ii) the first antenna port, and (iii) the second antenna port,
   wherein a second antenna arrangement comprises at least: (i) the third antenna port, (ii) the fourth antenna port, (iii) a first polarized antenna element arranged for at least one of transmitting and receiving signals at a first polarization via the third antenna port, and (iv) a second polarized antenna element arranged for at least one of transmitting and receiving signals at a second polarization via the fourth antenna port, and
   wherein the polarizations are mutually orthogonal in at least one direction.

10. The method according to claim 9, further comprising the step of switching from connecting the first radio chain arrangement with the first antenna port to connecting the first radio chain arrangement with the third antenna port when a relation between the measured interference level and noise level at the first antenna port exceeds a first threshold value, and the step of switching from connecting the second radio chain arrangement with the second antenna port to connecting the second radio chain arrangement with the fourth antenna port when a relation between the measured interference level and noise level at the second antenna port exceeds a second threshold value.

11. The method according to claim 9, further comprising the step of switching from connecting the first radio chain arrangement with the third antenna port to connecting the first radio chain arrangement with the first antenna port when a relation between the measured interference level and noise level at the third antenna port falls below a third threshold value, and the step of switching from connecting the second radio chain arrangement with the fourth antenna port to connecting the second radio chain arrangement with the second antenna port when a relation between the measured interference level and noise level at the fourth antenna port falls below a fourth threshold value.

12. The method according to claim 10, where the threshold values are determined using the previously known degrees of efficiency.

* * * * *